United States Patent
Yao et al.

(10) Patent No.: US 12,199,731 B2
(45) Date of Patent: Jan. 14, 2025

(54) METHOD OF BEAM STATE DETERMINATION

(71) Applicant: ZTE CORPORATION, Guangdong (CN)

(72) Inventors: Ke Yao, Shenzhen (CN); Bo Gao, Shenzhen (CN); Zhaohua Lu, Shenzhen (CN); Chuangxin Jiang, Shenzhen (CN); Hao Wu, Shenzhen (CN); Wenjun Yan, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 138 days.

(21) Appl. No.: 17/865,954

(22) Filed: Jul. 15, 2022

(65) Prior Publication Data
US 2022/0352968 A1 Nov. 3, 2022

Related U.S. Application Data

(63) Continuation of application No. PCT/CN2020/105573, filed on Jul. 29, 2020.

(51) Int. Cl.
*H04B 7/08* (2006.01)

(52) U.S. Cl.
CPC ........... *H04B 7/088* (2013.01); *H04B 7/0862* (2013.01)

(58) Field of Classification Search
CPC ... H04B 7/04; H04B 7/06; H04B 7/08; H04B 7/088; H04B 7/0408; H04B 7/0417; H04B 7/0862; H04L 5/00; H04L 5/0023; H04L 5/0048; H04L 5/0053; H04W 36/00; H04W 64/00; H04W 72/04; H04W 72/12; H04W 72/232; H04W 74/00; H04W 76/19

USPC ............... 375/219, 260, 267, 295, 316, 347
See application file for complete search history.

(56) References Cited

U.S. PATENT DOCUMENTS

| | | |
|---|---|---|
| 2018/0309496 A1 | 10/2018 | Lee et al. |
| 2020/0059951 A1 | 2/2020 | Frenne et al. |
| 2021/0306058 A1* | 9/2021 | Kim ........................ H04B 7/08 |

FOREIGN PATENT DOCUMENTS

CN 107733473 A 2/2018

OTHER PUBLICATIONS

Apple Inc., "On further MIMO enhancement", 3GPP TSG RAN WG1 #100b R1-2004234, e-Meeting, May 25, 2020 (10 pages).
Apple Inc., "Remaining issues for Multi-beam enhancement", 3GPP TSG RAN WG1 #100, R1-2000860, e-Meeting, Feb. 4, 2020 (12 pages).
Apple Inc., "Remaining issues on beam management enhancement", 3GPP TSG RAN WG1 #101 R1-2004230, e-Meeting, May 25, 2020 (12 pages).

(Continued)

*Primary Examiner* — Shawkat M Ali
(74) *Attorney, Agent, or Firm* — FOLEY & LARDNER LLP

(57) ABSTRACT

A wireless communication method for use in a wireless terminal is disclosed. The wireless communication method comprises receiving, from a wireless network node, first command information comprising a first beam state, determining at least one of a second beam state or a second reference signal based on the first beam state, and communicating, with the wireless network node, a target signal by applying at least one of the second beam state or the second reference signal.

18 Claims, 10 Drawing Sheets

(56) References Cited

OTHER PUBLICATIONS

Apple, "Feature Lead Summary #1 on L1-SINR and SCell BFR" 3GPP TSG RAN WG1 #101 R1-2004231, e-Meeting, May 25, 2020 (17 pages).
Apple, "Feature Lead Summary #2 on L1-SINR and SCell BFR" 3GPP TSG RAN WG1 #101 R1-2004232, e-Meeting, May 25, 2020 (17 pages).
Apple, "Feature Lead Summary on L1-SINR and SCell BFR", 3GPP TSG RAN WG1 #101, R1-20004709, e-Meeting, May 25, 2020 (15 pages).
AT&T, "Summary of UE features for eMIMO", 3GPP TSG RAN WG1 #101 R1-2004285, e-Meeting, May 25, 2020 (54 pages).
Ericsson, "Additional discussion on network impact of NR UE power saving" 3GPP TSG-RAN WG1 Meeting #96, R1-1902937, Feb. 25, 2019, Athens, Greece (3 pages).
Ericsson, "High Level Views on Rel-17 feMIMO", 3GPP TSG-RAN WG1 Meeting #101, R1-2004633, e-Meeting, May 25, 2020 (15 pages).
Guangdong et al., "Beam association relationship between data and control channels" 3GPP TSG RAN WG1 Meeting NR#3, R1-1715701, Sep. 18, 2017, Nagoya, Japan (2 pages).
International Search Report and Written Opinion for PCT Appl. No. PCT/CN2020/105573, mailed Apr. 25, 2021 (8 pages).
ITRI, "Discussion on channel access mechanism", 3GPP TSG RAN WG1 #101, R1-2004341, e-Meeting, May 25, 2020 (3 pages).
LG Electronics, "FL summary #1 on Rel-16 MB1 maintenance", 3GPP TSG RAN WG1 #101, R1-2003930, e-Meeting, May 25, 2020 (20 pages).
LG Electronics, "FL summary #2 on Rel-16 MB1 maintenance", 3GPP TSG RAN WG1 #101, R1-2003931, e-Meeting, May 25, 2020 (20 pages).
LG Electronics, "Outcome of email thread [101-e-NR-eMIMO-MB1-03]", 3GPP TSG RAN WG1 #101, R1-2004792, e-Meeting, May 25, 2020 (15 pages).
Nokia and Nokia Shanghai Bell, "FL summary update on cross-carrier scheduling with different numerology", 3GPP TSG RAN WG1 #100, R1-2001069. e-Meeting, Feb. 24, 2020 (17 pages).
NTT Docomo, Inc., "Discussion on multi-beam enhancement" 3GPP TSG RAN WG1 Meeting #95, R1-1813334, Nov. 12, 2018, Spokane, USA (14 pages).
Oppo, "Remaining issues on Multi-beam Operation Enhancement", 3GPP TSG RAN WG1 #101 R1-2004048, e-Meeting, May 25, 2020 (6 pages).
Samsung, "On Rel. 17 FeMIMO WI", 3GPP TSG RAN WG1 #101, R1-2003918, e-Meeting, May 25, 2020 (12 pages).
ZTE, "Further details on multi-beam/TRP operation" 3GPP TSG RAN WG1 Meeting #99, R1-1911933, Nov. 18, 2019, Reno, US (10 pages).
ZTE, "Preliminary views on further enhancement for NR MIMO", 3GPP TSG RAN WG1 Meeting #101, R1-2003483, e-Meeting, May 25, 2020 (18 pages).
Extended European Search Report for EP Appl. No. 20946621.8, dated Oct. 28, 2022 (9 pages).

* cited by examiner

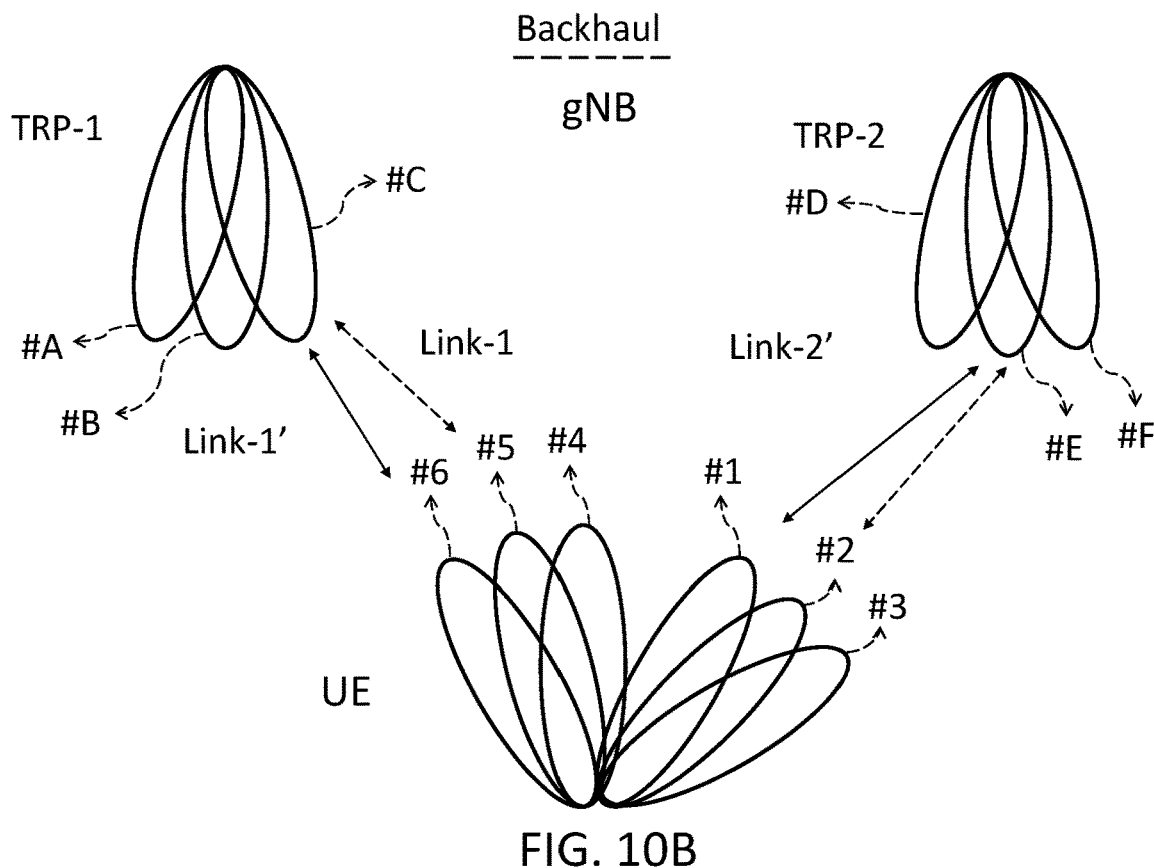

FIG. 10B

```
Communicate, by the gNB, a new second
beam state for a second link via a first link
with a current first beam state or the second      1100
link with a current second beam state
```
↓
```
Communicate, by the gNB, a new first
beam state for the first link via the second       1101
link with the new second beam state or the
first link with the current first beam state,
after the new second beam is stable
```

FIG. 11

1200 — Communicate, by the gNB with a UE, a new first beam state for a first link and a new second beam state for a second link, wherein one of the new first beam state and the new second beam state becomes effective after a first time point and another one of the new first beam state and the new second beam state becomes effective after a second time point

FIG. 12

1300 — Receive, from a wireless network node, first command information comprising a first beam state 1301 — Determine at least one of a second beam state or a second reference signal based on the first beam state 1302 — Communicate, with the wireless network node, a target signal by applying at least one of the second beam state or the second reference signal

FIG. 13

Transmit, to a wireless terminal, a first beam state and a second beam state, wherein one of the first beam sates and the second beam state is applied after a first time point and another one of the first beam state and the second beam state is applied after a second time point ⟵ 1600

FIG. 16

Receive, from a wireless network node, a plurality of beam states classified into a plurality of beam state groups, wherein the plurality of beam states becomes effective separately after a plurality of time points ⟵ 1700

FIG. 17

Transmit, to a wireless terminal, a plurality of beam states classified into a plurality of beam state groups, wherein the plurality of beam states becomes effective separately after a plurality of time points ⟋ 1800

FIG. 18

METHOD OF BEAM STATE DETERMINATION

CROSS-REFERENCE TO RELATED APPLICATION

This application claims the benefit of priority under 35 U.S.C. § 120 as a continuation of PCT Patent Application No. PCT/CN2020/105573, filed on Jul. 29, 2020, the disclosure of which is incorporated herein by reference in its entirety.

TECHNICAL FIELD

This document is directed generally to wireless communications.

SUMMARY

One of the key features of the new radio (NR) technology of fifth generation (5G) mobile communication systems is the support of high frequency bands. High frequency bands have abundant frequency domain resources, but wireless signals in high frequency bands decay quickly and coverage of the wireless signals becomes small. Thus, transmitting signals in a beam mode is able to concentrate energy in a relatively small spatial range and to improve the coverage of the wireless signals in the high frequency bands. In the beam scenario, as the time and position change, a beam pair between a base station and a user equipment (UE) may also change. Thus, a flexible beam update mechanism is required.

At present, the NR technology supports a basic beam mechanism with an assumption that the UE has a single panel and/or communicates with a single transmission (Tx) reception (Rx) point (TRP). However, the basic beam mechanism may not be able to indicate the beams for multiple channels and/or multi-panels/multi-TRPs scenario.

This document relates to methods, systems, and devices for determining a beam state for a target signal.

The present disclosure relates to a wireless communication method for use in a wireless terminal. The wireless communication method comprises:

receiving, from a wireless network node, first command information comprising a first beam state, determining at least one of a second beam state or a second reference signal based on the first beam state, and communicating, with the wireless network node, a target signal by applying at least one of the second beam state or the second reference signal.

Various embodiments may preferably implement the following features:

Preferably, one of the first beam state or the second beam state comprises at least one of a quasi-co-location state, a transmission configuration indicator state, spatial relation information, reference signal information, spatial filter information or precoding information.

Preferably, the second beam state is associated with the first beam state.

Preferably, the second beam state is associated with a beam state group associated with the first beam state.

Preferably, the second beam state is a beam state with one of a predefined index, the first index or the last index in the beam state group associated with the first beam state.

Preferably, the wireless communication method further comprises receiving, from the wireless network node, second command information indicating a beam state in the beam state group associated with the first beam state as the second beam state.

Preferably, the first command information is the most recent command information received by the wireless terminal before the second command information.

Preferably, the first command information and the second command information relate to the same CORESET pool.

Preferably, the first command information and the second command information related to at least one of the same BWP or the same serving cell.

Preferably, the first command information is the most recent command information with an effective beam state received by the wireless terminal before the second command information.

Preferably, the second beam state is a beam state of a first mode associated with the first beam state.

Preferably, the beam state of the first mode has a smaller beam granularity than a beam state of a second mode.

Preferably, a beam width of the beam state of the first mode is wider than a beam width of a beam state of a second mode.

Preferably, the number of the beam states of the first mode is smaller than the number of beam states of a second mode.

Preferably, the second beam state is at least one of an upper layer beam state of the first beam state, a reference beam state of a reference signal in the first beam state, or a synchronization signal block associated with the first beam state.

Preferably, the second reference signal is associated with a reference signal in the first beam state.

Preferably, the second reference signal is determined according to at least one of:

a reference signal in a beam state of a reference signal in the first beam state, a reference signal quasi co-located with a reference signal in the first beam state, or a spatial relation RS of a reference signal in the first beam state.

Preferably, the second reference signal is determined according to at least one of:

a reference signal in a beam state of a reference signal with a type of quasi-co-location in the first beam state, a reference signal quasi co-located with a reference signal with a type of quasi-co-location in the first beam state, or a spatial relation reference signal of a first reference signal with a type of quasi-co-location in the first beam state.

Preferably, the first beam state comprises a plurality of reference signals.

Preferably, the target signal is not scheduled by the first downlink control information.

Preferably, the target signal is associated with the first command information or with a signal scheduled by the first command information.

Preferably, an association between the target signal and the first command information or an association between the target signal and the signal scheduled by the first downlink control information is predefined or configured by the wireless network node.

Preferably, the target signal comprises at least one of a physical downlink control channel, a physical uplink control channel, a physical downlink shared channel, a physical uplink shared channel, a channel state information reference signal, or a sounding reference signal.

The present disclosure relates to a wireless communication method for use in a wireless network node. The wireless communication method comprises:

transmitting, to a wireless terminal, first command information comprising a first beam state, and communicating, with the wireless terminal, a target signal by applying at least one of a second beam state or a second reference signal, wherein at least one of the second beam state or the second reference signal is determined based on the first beam state.

Various embodiments may preferably implement the following features:

Preferably, one of the first beam state or the second beam state comprises at least one of a quasi-co-location state, a transmission configuration indicator state, spatial relation information, reference signal information, spatial filter information or precoding information.

Preferably, the second beam state is associated with the first beam state.

Preferably, the second beam state is associated with a beam state group associated with the first beam state.

Preferably, the second beam state is a beam state with one of a predefined index, the first index or the last index in the beam state group associated with the first beam state.

Preferably, the wireless communication method further comprises transmitting second command information to the wireless network node, wherein the second command information indicates a beam state in the beam state group associated with the first beam state as the second beam state.

Preferably, the first command information is the most recent command information received by the wireless terminal before the second command information.

Preferably, the first command information and the second command information relate to the same CORESET pool.

Preferably, the first command information and the second command information related to at least one of the same BWP or the same serving cell.

Preferably, the first command information is the most recent command information with an effective beam state received by the wireless terminal before the second command information.

Preferably, the second beam state is a beam state of a first mode associated with the first beam state.

Preferably, the beam state of the first mode has a smaller beam granularity than a beam state of a second mode.

Preferably, a beam width of the beam state of the first mode is wider than a beam width of a beam state of a second mode.

Preferably, the number of the beam states of the first mode is smaller than the number of beam states of a second mode.

Preferably, the second beam state is at least one of an upper layer beam state of the first beam state, a reference beam state of a reference signal in the first beam state, or a synchronization signal block associated with the first beam state.

Preferably, the second reference signal is associated with a reference signal in the first beam state.

Preferably, the second reference signal is determined according to at least one of:

a reference signal in a beam state of a reference signal in the first beam state, a reference signal quasi co-located with a reference signal in the first beam state, or a spatial relation RS of a reference signal in the first beam state.

Preferably, the second reference signal is determined according to at least one of:

a reference signal in a beam state of a reference signal with a type of quasi-co-location in the first beam state, a reference signal quasi co-located with a reference signal with a type of quasi-co-location in the first beam state, a spatial relation reference signal of a first reference signal with a type of quasi-co-location in the first beam state.

Preferably, the first beam state comprises a plurality of reference signals.

Preferably, the target signal is not scheduled by the first downlink control information.

Preferably, the target signal is associated with the first command information or with a signal scheduled by the first command information.

Preferably, an association between the target signal and the first command information or an association between the target signal and the signal scheduled by the first downlink control information is predefined or configured by the wireless network node.

Preferably, the target signal comprises at least one of a physical downlink control channel, a physical uplink control channel, a physical downlink shared channel, a physical uplink shared channel, a channel state information reference signal, or a sounding reference signal.

The present disclosure relates to a wireless communication method for use in a wireless terminal. The wireless communication method comprises:

receiving, from a wireless network node, a first beam state and a second beam state, and applying one of the first beam states and the second beam state after a first time point and applying another one of the first beam state and the second beam state after a second time point.

Various embodiments may preferably implement the following features:

Preferably, the second time point is determined according to at least one of the first time point, or a time offset.

Preferably, the first time point is different from the second time point.

Preferably, the first beam state and the second beam state are received via at least one of DCI or a MAC CE.

Preferably, the first beam state is used for a first link and the second beam state is used for a second link.

Preferably, the second time point is determined according to at least one of: a time point of receiving response information from the wireless network node via the first link related to the first beam state, or a time offset.

Preferably, the first beam state is related to a CORESET pool and the second beam state is related to another CORESET pool.

The present disclosure relates to a wireless communication method for use in a wireless network node. The wireless communication method comprises:

transmitting, to a wireless terminal, a first beam state and a second beam state, wherein one of the first beam state and the second beam state is applied after a first time point and another one of the first beam state and the second beam state is applied after a second time point.

Various embodiments may preferably implement the following features:

Preferably, the second time point is determined according to at least one of the first time point, or a time offset.

Preferably, the first time point is different from the second time point.

Preferably, the first beam state and the second beam state are received via at least one of DCI or a MAC CE.

Preferably, the first beam state is used for a first link and the second beam state is used for a second link.

Preferably, the second time point is determined according to at least one of: a time point of receiving response information from the wireless network node via the first link related to the first beam state, or a time offset.

Preferably, the first beam state is related to a CORESET pool and the second beam state is related to another CORESET pool.

The present disclosure relates to a wireless communication method for use in a wireless terminal. The wireless communication method comprises:

receiving, from a wireless network node, a plurality of beam states classified into a plurality of beam state groups, wherein the plurality of beam states is applied separately after a plurality of time points.

Various embodiments may preferably implement the following features:

Preferably, the beam states in the same beam state group are applied after the same time point.

Preferably, the beam states in different beam state groups are applied after different time points.

Preferably, the earliest time point in the plurality of time points is a first time offset after a reception time of receiving the plurality of beam states, wherein there is a second time offset between every two contiguous time points in the plurality of time points.

Preferably, at least one of the first time offset or the second time offset is configured by a higher layer signaling.

The present disclosure relates to a wireless communication method for use in a wireless network node. The wireless communication method comprises:

transmitting, to a wireless terminal, a plurality of beam states classified into a plurality of beam state groups, wherein the plurality of beam states is applied separately after a plurality of time points.

Various embodiments may preferably implement the following features:

Preferably, the beam states in the same beam state group are applied after the same time point.

Preferably, the beam states in different beam state groups are applied after different time points.

Preferably, the earliest time point in the plurality of time points is a first time offset after a reception time of receiving the plurality of beam states, wherein there is a second time offset between every two contiguous time points in the plurality of time points.

Preferably, at least one of the first time offset or the second time offset is configured by a higher layer signaling.

The present disclosure relates to a wireless terminal, comprising:

a communication unit, configured to receive, from a wireless network node, first command information comprising a first beam state, and a processor configured to determine at least one of a second beam state or a second reference signal based on the first beam state, wherein the communication unit is further configured to communicate, with the wireless network node, a target signal by applying at least one of the second beam state or the second reference signal.

Various embodiments may preferably implement the following feature:

Preferably, the processor is configured to perform a wireless communication method of any of the foregoing described methods.

The present disclosure relates to a wireless network node, comprising:

a communication unit, configured to:

transmit, to a wireless terminal, first command information comprising a first beam state, and communicate, with the wireless terminal, a target signal by applying at least one of a second beam state or a second reference signal, wherein at least one of the second beam state or the second reference signal is determined based on the first beam state.

Various embodiments may preferably implement the following feature:

Preferably, the wireless network node further comprises a processor configured to perform a wireless communication method of any of the foregoing described methods.

The present disclosure relates to a wireless terminal, comprising:

a communication unit, configured to receive, from a wireless network node, a first beam state and a second beam state, and a processor configured to apply one of the first beam states and the second beam state after a first time point and applying another one of the first beam state and the second beam state after a second time point.

Various embodiments may preferably implement the following feature:

Preferably, the processor is configured to perform a wireless communication method of any of the foregoing described methods.

The present disclosure relates to a wireless network node, comprising:

a communication unit, configured to transmit, to a wireless terminal, a first beam state and a second beam state, wherein one of the first beam states and the second beam state is applied after a first time point and another one of the first beam state and the second beam state is applied after a second time point.

Various embodiments may preferably implement the following feature:

Preferably, the wireless network node further comprises a processor configured to perform a wireless communication method of any of the foregoing described methods.

The present disclosure relates to a wireless terminal, comprising:

a communication unit, configured to receive, from a wireless network node, a plurality of beam states classified into a plurality of beam state groups, and wherein the plurality of beam states are applied separately after a plurality of time points.

Various embodiments may preferably implement the following feature:

Preferably, the wireless terminal further comprises a processor configured to perform a wireless communication method of any of the foregoing described methods.

The present disclosure relates to a wireless network node, comprising:

a communication unit, configured to transmit, to a wireless terminal, a plurality of beam states classified into a plurality of beam state groups, wherein the plurality of beam states is applied separately after a plurality of time points.

Various embodiments may preferably implement the following feature:

Preferably, the wireless network node further comprises a processor configured to perform a wireless communication method of any of the foregoing described methods.

The present disclosure relates to a computer program product comprising a computer-readable program medium code stored thereupon, the code, when executed by a processor, causing the processor to implement a wireless communication method recited in any of foregoing methods.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

BRIEF DESCRIPTION OF THE DRAWINGS

FIG. 10B shows a schematic diagram of a multi-transmission-reception-points/multi-panels scenario according to an embodiment of the present disclosure.

FIG. 11 shows a flowchart of a process according to an embodiment of the present disclosure.

FIG. 12 shows a flowchart of a process according to an embodiment of the present disclosure.

FIG. 13 shows a flowchart of a process according to an embodiment of the present disclosure.

FIG. 16 shows a flowchart of a process according to an embodiment of the present disclosure.

FIG. 17 shows a flowchart of a process according to an embodiment of the present disclosure.

FIG. 18 shows a flowchart of a process according to an embodiment of the present disclosure.

DETAILED DESCRIPTION

Figure 1:
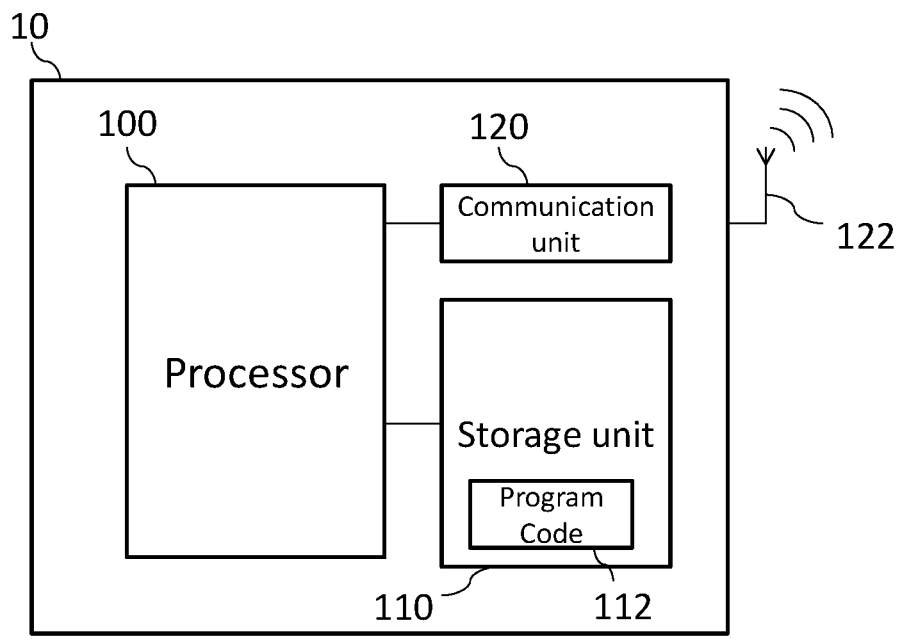
FIG. 1 shows an example of a schematic diagram of a wireless terminal according to an embodiment of the present disclosure.

FIG. 1 relates to a schematic diagram of a wireless terminal 10 according to an embodiment of the present disclosure. The wireless terminal 10 may be a user equipment (UE), a mobile phone, a laptop, a tablet computer, an electronic book or a portable computer system and is not limited herein. The wireless terminal 10 may include a processor 100 such as a microprocessor or Application Specific Integrated Circuit (ASIC), a storage unit 110 and a communication unit 120. The storage unit 110 may be any data storage device that stores a program code 112, which is accessed and executed by the processor 100. Embodiments of the storage unit 112 include but are not limited to a subscriber identity module (SIM), read-only memory (ROM), flash memory, random-access memory (RAM), hard-disk, and optical data storage device. The communication unit 120 may a transceiver and is used to transmit and receive signals (e.g. messages or packets) according to processing results of the processor 100. In an embodiment, the communication unit 120 transmits and receives the signals via at least one antenna 122 shown in FIG. 1.

In an embodiment, the storage unit 110 and the program code 212 may be omitted and the processor 100 may include a storage unit with stored program code.

The processor 100 may implement any one of the steps in exemplified embodiments on the wireless terminal 10, e.g., by executing the program code 112.

The communication unit 120 may be a transceiver. The communication unit 120 may as an alternative or in addition be combining a transmitting unit and a receiving unit configured to transmit and to receive, respectively, signals to and from a wireless network node (e.g. a base station).

Figure 2:
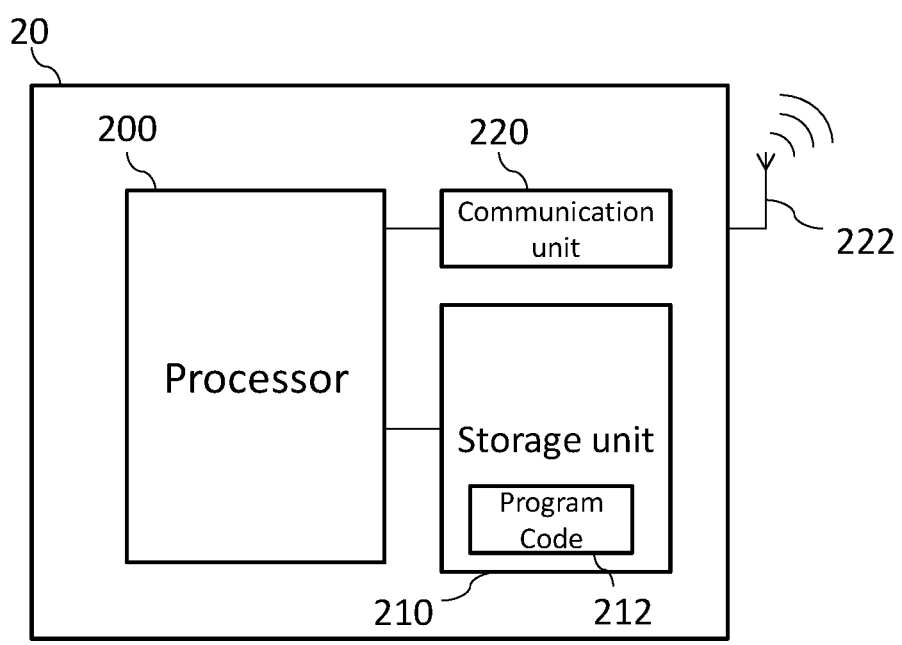
FIG. 2 shows an example of a schematic diagram of a wireless network node according to an embodiment of the present disclosure.

FIG. 2 relates to a schematic diagram of a wireless network node 20 according to an embodiment of the present disclosure. The wireless network node 20 may be a satellite, a base station (BS), a network entity, a Mobility Management Entity (MME), Serving Gateway (S-GW), Packet Data Network (PDN) Gateway (P-GW), a radio access network (RAN), a next generation RAN (NG-RAN), a data network, a core network or a Radio Network Controller (RNC), and is not limited herein. In addition, the wireless network node 20 may comprise (perform) at least one network function such as an access and mobility management function (AMF), a session management function (SMF), a user place function (UPF), a policy control function (PCF), an application function (AF), etc. The wireless network node 20 may include a processor 200 such as a microprocessor or ASIC, a storage unit 210 and a communication unit 220. The storage unit 210 may be any data storage device that stores a program code 212, which is accessed and executed by the processor 200. Examples of the storage unit 212 include but are not limited to a SIM, ROM, flash memory, RAM, hard-disk, and optical data storage device. The communication unit 220 may be a transceiver and is used to transmit and receive signals (e.g. messages or packets) according to processing results of the processor 200. In an example, the communication unit 220 transmits and receives the signals via at least one antenna 222 shown in FIG. 2.

In an embodiment, the storage unit 210 and the program code 212 may be omitted. The processor 200 may include a storage unit with stored program code.

The processor 200 may implement any steps described in exemplified embodiments on the wireless network node 20, e.g., via executing the program code 212.

The communication unit 220 may be a transceiver. The communication unit 220 may as an alternative or in addition be combining a transmitting unit and a receiving unit configured to transmit and to receive, respectively, signals to and from a wireless terminal (e.g. a user equipment).

In the present disclosure, "QCL state" is comprised of one or more reference RSs and their corresponding QCL type parameters, where the QCL type parameters include at least one of the following aspects or combinations: [1] a Doppler spread, [2] a Doppler shift, [3] a delay spread, [4] an average delay, [5] an average gain, and [6] a spatial parameter (which is also called as a spatial Rx parameter). In the present disclosure, "TCI state" is equivalent to "QCL state". In the present disclosure, there are the following definitions for 'QCL-TypeA', 'QCL-TypeB', 'QCL-TypeC', and 'QCL-TypeD'.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

In the present disclosure, a beam may be equal to a beam state.

In an embodiment, a beam state of first DCI is applied for a target transmission (e.g. a target signal). More specifically, one of beam states (e.g. indicated, comprised or included) in the first DCI is applied for the target transmission, wherein the target transmission is not scheduled by the first DCI.

Figure 3:
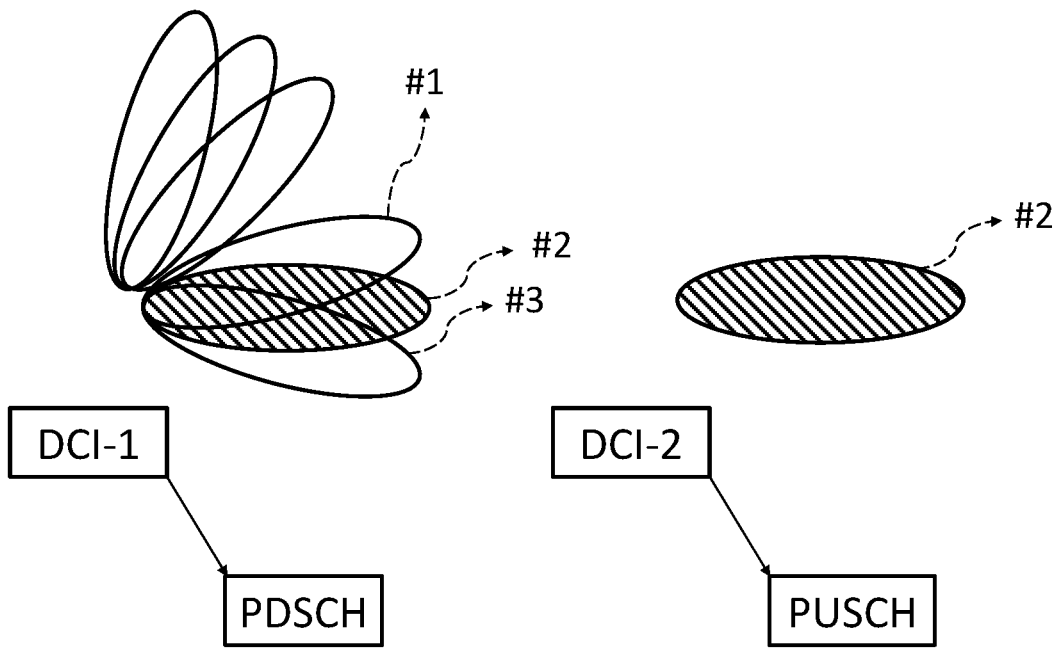
FIG. 3 shows a schematic diagram of beam states according to an embodiment of the present disclosure.

FIG. 3 shows a schematic diagram of beam states according to an embodiment of the present disclosure. In FIG. 3, DCI-1 (e.g. the first DCI) includes (e.g. indicates) beam states (e.g. one of more beam states among beam states #1 to #3) for a transmission of a physical downlink shared channel (PDSCH). In an embodiment, the beam state is a downlink reference signal (RS). In an embodiment, the beam states comprised in the DCI-1 may be applied to a subsequent PUSCH according to reciprocity between DL transmissions and UL transmissions.

In the embodiment shown in FIG. 3, DCI-2 schedules a PUSCH transmission occasion. When this PUSCH transmission occasion uses the beam state(s) in the DCI-1, the DCI-2 does not need to indicate the beam states for the PUSCH transmission. That is, the DCI-2 may need to indicate only scheduling information, such as time domain, frequency domain resource(s), a TPMI (transmit precoding matrix index), port information, etc. As shown in FIG. 3, the beam state #2 in the DCI-1 is applied to both the PDSCH transmission occasion and the PUSCH transmission occasion.

In an embodiment, a beam state applied to a target signal may be associated to another beams state comprised in the DCI which does not schedule the target signal or schedules other signals.

In an embodiment, the target signal comprises at least one of a physical downlink control channel (PDCCH), a physical uplink control channel (PUCCH), a physical downlink shared channel (PDSCH), a physical uplink shared channel (PUSCH), a channel state information reference signal (CSI-RS), or a sounding reference signal (SRS).

For example, the UE may receive first command information comprising a first beam state and may apply a second beam state associated with the first beam state for a target signal. In an embodiment, the target signal is not scheduled by the first command information and/or the target signal is associated with a signal scheduled by the first command information.

In an embodiment, the (first) command information refers to the DCI, a media access control element (MAC CE) or a radio resource control signaling.

Figure 4:
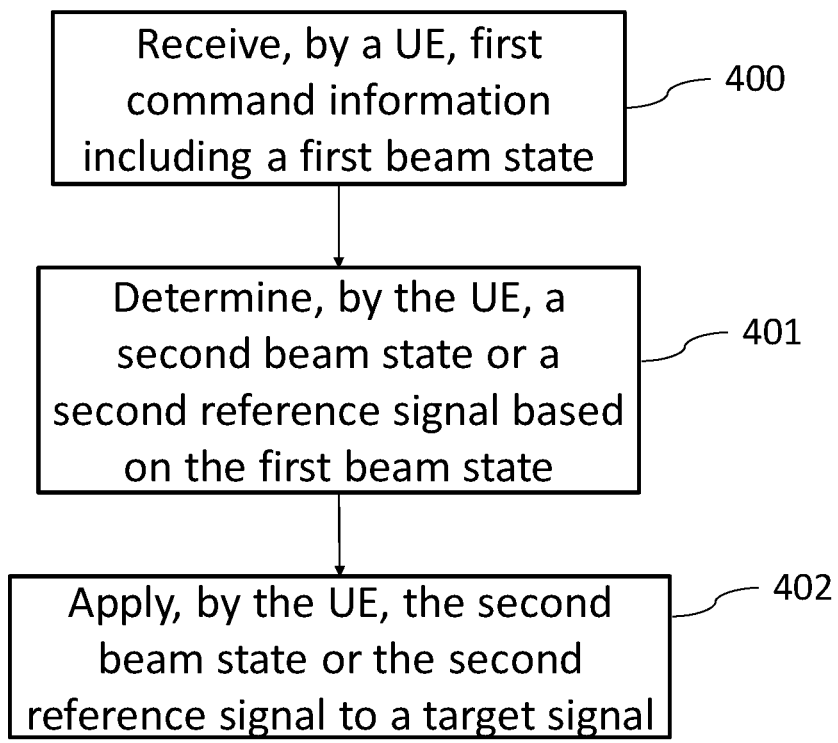
FIG. 4 shows a flowchart of a process according to an embodiment of the present disclosure.

FIG. 4 shows a flowchart of a process according to an embodiment of the present disclosure. The process shown in FIG. 4 may be compiled into the program code and comprises the following steps:

Step 400: Receive, by a UE, first command information including a first beam state.

Step 401: Determine, by the UE, a second beam state or a second reference signal based on the first beam state.

Step 402: Apply, by the UE, the second beam state or the second reference signal to a target signal.

In the process shown in FIG. 4, the UE may receive first command information (e.g. the DCI) from a BS (e.g. gNB), wherein the first command information comprises a first beam state. Based on the first beam state, the UE determines a second beam state or a second RS associated with the first beam state and applies the determined second beam state or the determined second RS to a target signal.

In an embodiment, the beam state (e.g. the first beam state and/or the second beam state) comprises (e.g. refers to or indicates) at least one of a quasi-co-location (QCL) state, a transmission configuration indicator (TCI) state, spatial relation information, RS information, spatial filter information and/or precoding information.

In an embodiment, the second beam state is a beam state associated with the first beam state.

In an embodiment, the second beam state is a beam state associated with a beam state group associated with the first beam state. For example, the second beam state may be associated with the beam state group comprising the first beam state.

In an embodiment, the second beam state may be a wide beam state associated with (e.g. comprise) the beam state group associated with (e.g. comprising) the first beam state. For example, the beam state group associated with the first beam state may comprise a wide beam state and at least one narrow beam, wherein the wide beam state has a greater beam width and/or a lower beamforming/array/antenna gain than that of each narrow beam state.

In an embodiment, the second beam state is a beam state with a first mode (e.g. mode 1) associated with the first beam state. In an embodiment, the beam state of the first mode has a smaller beam granularity than a beam state of a second mode (e.g. mode 2). In an embodiment, a beam width of the beam state of the first mode is wider than a beam width of a beam state of the second mode. In an embodiment, the number of the beam states of the first mode (e.g. configured to a UE) is smaller than the number of beam states of the second mode. That is, the beam state of the first mode may be the wide beam (state) and the beam state of the second mode is the narrow beam (state)

For example, the UE may be configured with at least one beam state of the first mode and at least one beam stated of the second mode, wherein the beam state of the first mode has less beam granularity compared with the beam state of the second mode. For instance, the beam state of first mode may refer to the wide beam state or a wider beam state compared with the beam state of the second mode 2. In an embodiment, the number of the beam states of the first mode configured to the UE is not (expected to be) larger than that of the beam states of the second mode.

In an embodiment, the second beam state is a beam state with a specific index within the beam state group including or associated with the first beam state. For example, the specific index comprises at least one of a predefined index, the maximum (e.g. the last) index or the minimum (the first) index.

In an embodiment, the second beam state is a beam state located in a certain place in an association with at least the first beam state and the second beam state. In an embodiment, the certain place comprises a first or the last beam state associated with the first beam state.

In an embodiment, the second beam state may be an upper layer beam state of the first beam state. Note that, in a multi-layers beam state structure, the upper layer includes the upper first layer or upper $X^{th}$ layer, wherein X is a positive integer greater than 1.

In an embodiment, the second beam state is a reference beam state of the first beam state. In this embodiment, the reference beam state of the first beam state includes a direct reference beam state of the first beam state and/or an indirect reference beam state of the first beam state. In an embodiment, the indirect reference beam state of the first beam state refers to a reference beam state of the direct reference beam state of the first beam state.

In an embodiment, the second beam state is the synchronization signal block (SSB) (which may be called synchronization signal and physical broadcast channel (SS/PBCH) block) which is associated with the first beam state.

In an embodiment, the second RS is associated with an RS in the first beam state.

In an embodiment, the second RS is determined according to at least one of:
an RS in a beam state of a reference signal in the first beam state,
an RS which is quasi co-located with a reference signal in the first beam state, or
a spatial relation RS of an RS in the first beam state.

In an embodiment, the spatial relation RS of the RS in the first beam state may refer to a spatial relation with a reference to the RS in the first beam state.

In an embodiment, the second RS is determined according to at least one of:
a reference signal in a beam state of a reference signal with a QCL type in the first beam state,
a reference signal quasi co-located with a reference signal with a QCL type in the first beam state, or
a spatial relation reference signal of a first reference signal with a QCL type in the first beam state.

In an embodiment, the QCL type may refer to a QCL-TypeD, a type of QCL assumption, or a spatial parameter.

In an embodiment, there are more than one RS in the first beam state.

In an embodiment, the target signal is not scheduled by the first DCI.

In an embodiment, the first DCI schedules a signal. As an alternative, the first DCI is not used to schedule any signal.

In an embodiment, the target signal has a type different from that of the signal scheduled by the first DCI, if any.

In an embodiment, the target signal may be scheduled by second DCI.

In an embodiment, the target signal and/or the second DCI is after the first DCI.

In an embodiment, the target signal and/or the second DCI is after the signal scheduled by the first DCI.

In an embodiment, the target signal and/or the second DCI is after the beam state(s) scheduled by the first DCI becomes effective (e.g. available or being applied).

In an embodiment, the target signal is associated with the signal scheduled by the first DCI. In this embodiment, an association between the target signal and the signal scheduled by the first DCI is predefined or configured by the gNB or the network.

Figure 5:
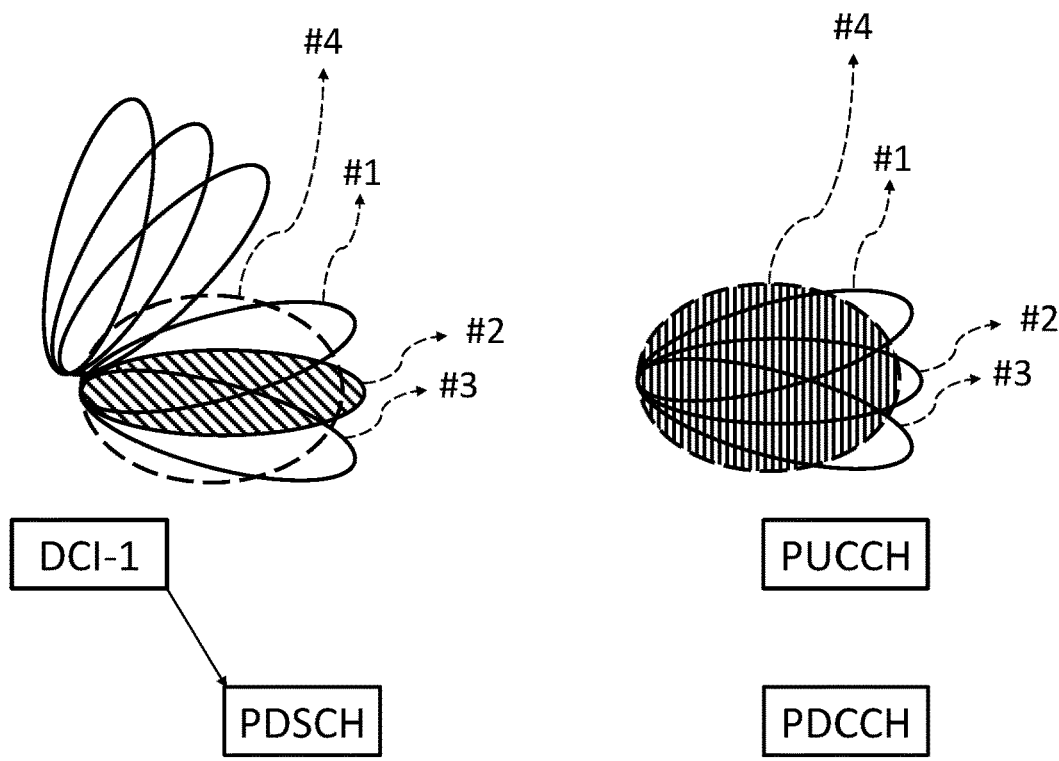
FIG. 5 shows a schematic diagram of the beam states according to an embodiment of the present disclosure.

FIG. 5 shows a schematic diagram of the beam states according to an embodiment of the present disclosure. In the embodiment shown in FIG. 5, the first beam state is the narrow beam (state) and the second beam state is the wide beam (state), e.g., in the beam (state) group associated with the first beam state. In addition, the target signal comprises a control channel (e.g. a PDCCH and/or a PUCCH).

More specifically, in multi-beams scenario, since the wide beam has a wide coverage, the beam changing frequency is low when the UE moves. However, the wide beam may reach smaller distance. Generally, the wide beam is suitable for the control channel because of a low data rate and a high robustness of the control channel. In comparison, the narrow beam is suitable for a data channel or a shared channel.

In order to enhance the mobility performance, when a beam state indicated by the (unified) command information is applied to multiple channels, the association between the wide beams and the narrow beams indicated by (e.g. comprised in) the command information can be explored, to apply the narrow beam which is indicated by the command information to the data channel and apply the associated wide beam to the control channel. As a result, an overhead of the beam indication is reduced and a stable beam change for the control channel can be acquired.

In FIG. 5, the DCI-1 (i.e. the first command information) indicates a beam state #2 for the PDSCH, wherein the beam state #2 is the narrow beam state and is associated with beam states #1, #3 and #4. Note that the beam states #1 and #3 are narrow beam states and the beam state #4 is the wide beam state. In such case, the wide beam state #4 may be applied to at least one of the associated PDCCH or PUCCH because being the wide beam state and associated with the beam state #2 indicated by the DCI-1.

In an embodiment, when there are multiple beam states associated with the first beam state and one of the beam states may be selected for being applied to the target signal (e.g. the control channel). In an embodiment, the following beam state may be applied to the target signal:
1) a current beam state of the target signal; or
2) the first one or the last one of the beam states (e.g. the beam state with the highest index or the lowest index) associated with the first beam state.

Figure 6:
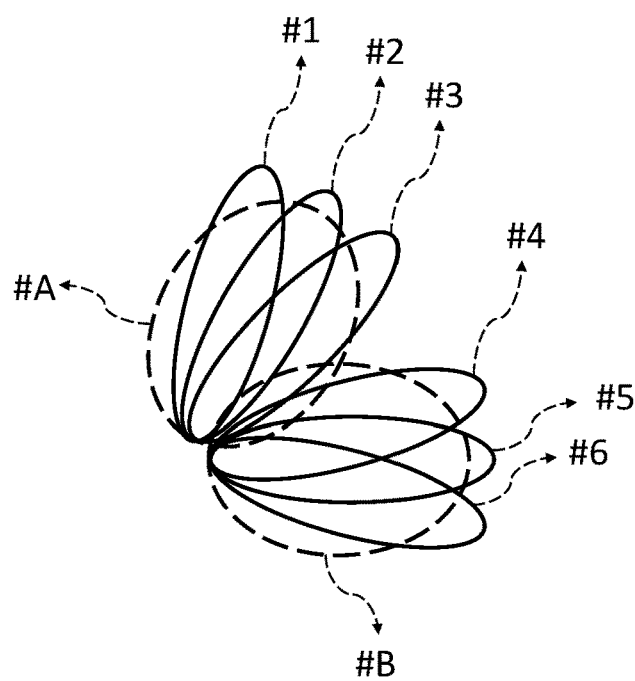
FIG. 6 shows a schematic diagram of 8 beam states according to an embodiment of the present disclosure.

FIG. 6 shows a schematic diagram of 8 beam states according to an embodiment of the present disclosure. As shown in FIG. 6, beam states #1, #2, . . . , #6 are narrow beams and beam states #A and #B are wide beams. The associations between wide beam states and narrow beam states are exemplified as the following:
the beam states #1, #2, #3 and #4 are associated with the beam state #A; and
the beam states #3, #4, #5 and #6 are associated with the beam state #B.

Note that the beam state #3 is associated with both the beam states #A and #B. Similarly, the beam state #4 is also associated with both the beam states #A and #B.

In an embodiment, the first command information indicates the beam state #1 for the PDSCH. In this embodiment, the beam state #A may be applied to the associated PDCCH, e.g., because being associated with the beam state #1 and being the wide beam.

In an embodiment, when the first command information indicates the beam state #3 for the PDSCH, the beam state #A is applied to the PDCCH.

In an embodiment, when the first command information indicates the beam state #4 for the PDSCH, the beam state #A is applied to the PDCCH. In this embodiment, the beam state #4 is associated with beam state #A and #B and the beam state #A is the current beam state of the target signal (i.e. the PDCCH). Thus, the beam state #A is kept as the beam state applied for the PDCCH.

In an embodiment, when the first command information indicates the beam state #5 for the PDSCH, the beam state #B is applied to the PDCCH.

In an embodiment, when the first command information indicates the beam state #4 for the PDSCH, the beam state #B is applied to the PDCCH. In this embodiment, the beam state #4 is associated with the beam states #A and #B and the beam state #B is the current beam state of the target signal (i.e. the PDCCH). Therefore, the beam state #B is kept as the beam state applied for the PDCCH.

In an embodiment, when a unified TCI framework is adopted, the second beam state which is associated with the first beam state comprised in the first command information and applied to the target signal may be determined based on the following embodiments:

In an embodiment, when the first command information indicates a TCI state and there is a wide beam state or an upper layer beam state associated with the RS of QCL typeD information in the TCI state, the second beam state is the wide beam state or the upper layer beam state.

In an embodiment, when the first command information indicates a TCI state and there is neither wide beam state nor an upper layer beam state associated with the RS of QCL typeD information in the TCI state, the second beam state is the RS of QCL typeD information in the TCI state.

In an embodiment, when the first command information indicates a TCI state and there are both the wide beam state and the narrow beam state associated with the TCI state, the second beam state is the wide beam state.

In an embodiment, the second beam state applied for the target signal may be further indicated by second command information. For example, the second command information may indicate one beam state which is within the beam state group associated with the first beam state indicated by the first command information as the second beam state applied to the target signal (e.g. target transmission). That is, the beam state indication applied for the target transmission has a 2-layers structure.

Figure 7:
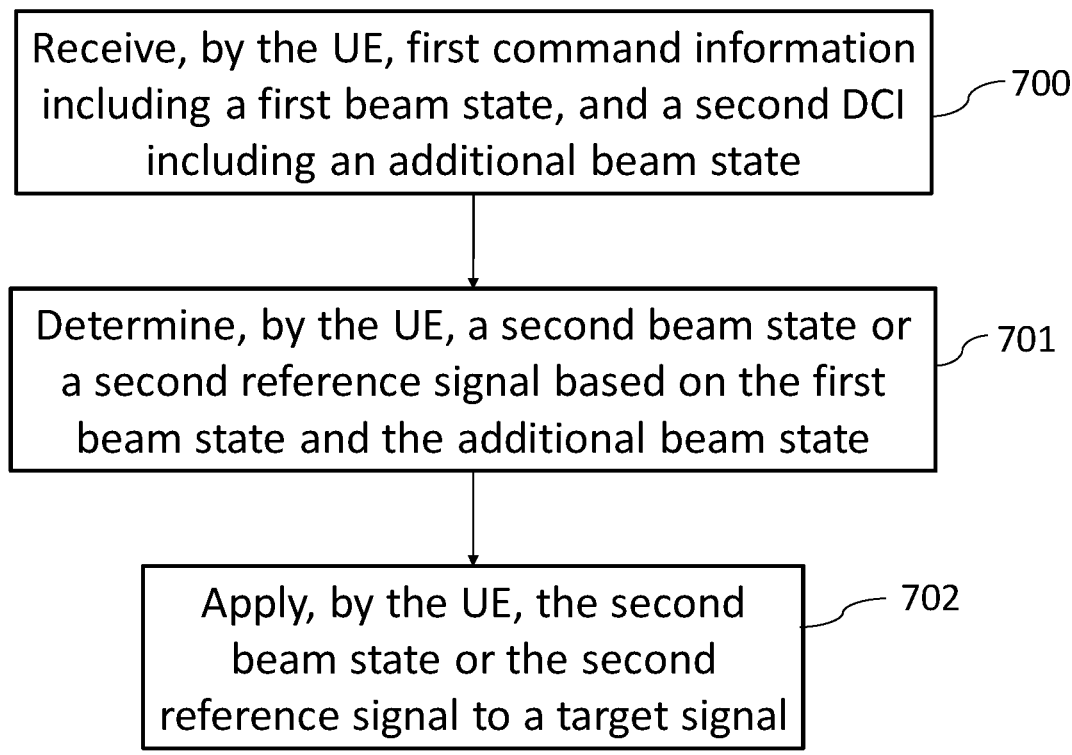
FIG. 7 shows a flowchart of a process according to an embodiment of the present disclosure.

FIG. 7 shows a flowchart of a process according to an embodiment of the present disclosure. The process shown in FIG. 7 may be performed by the UE and comprises the following steps:

Step 700: Receive, by the UE, first command information including a first beam state, and a second command information including an additional beam state.

Step 701: Determine, by the UE, a second beam state or a second reference signal based on the first beam state and the additional beam state.

Step 702: Apply, by the UE, the second beam state or the second reference signal to a target signal.

In the process shown in FIG. 7, the UE receives first command information and second command information from the BS, wherein the first command information comprises (e.g. indicates) a first beam state and the second command information comprises an additional beam state. Based on the first beam state and the additional beam state, the UE determines a second beam state or a second RS and applies the second beam state or the second RS to a target signal.

In an embodiment, the additional beam state is within a beam state group associated with the first beam state.

Figure 8:
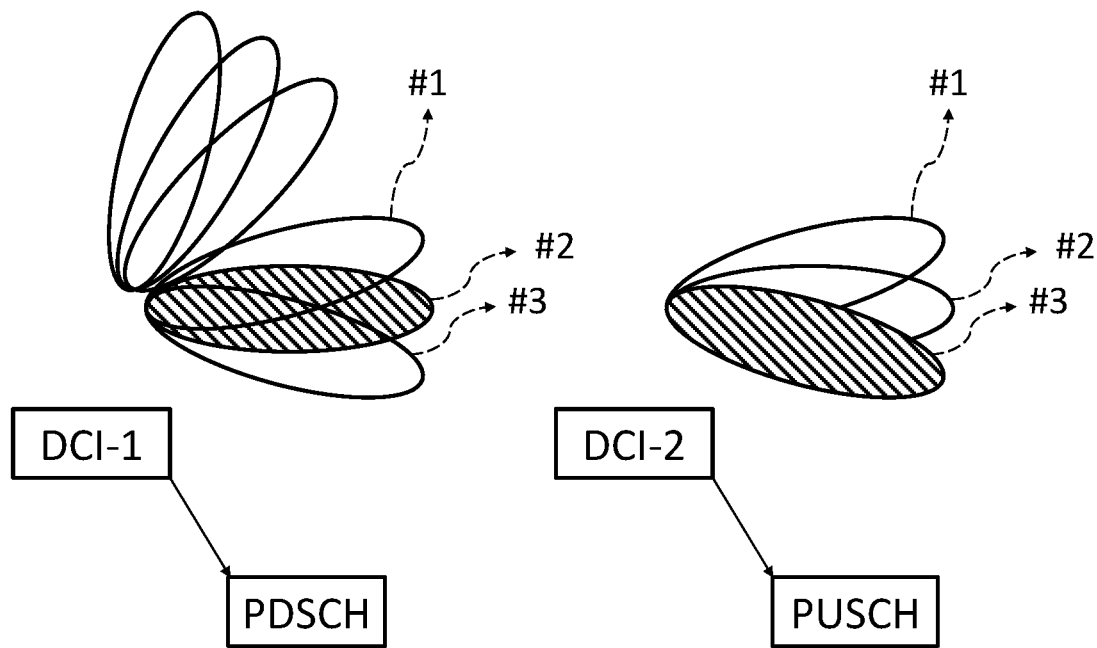
FIG. 8 shows a schematic diagram of beam states according to an embodiment of the present disclosure.

FIG. 8 shows a schematic diagram of beam states according to an embodiment of the present disclosure. In FIG. 8, DCI-1 (i.e. the first command information) indicates a beam state #2 (i.e. the first beam state) for the PDSCH, wherein the beam state #2 is associated with a beam state group including beam states #1, #2 and #3. In addition, DCI-2 (i.e. the second command information) indicates the beam state #3 (i.e. the additional beam state) for the PUSCH. Note that the beam state #3 indicated by the DCI-2 which is within the beam state group associated with the beam state #2.

Since the additional beam state is within the beam state group associated with the first beam state, the overhead of indicating the additional beam state in the second command information is expected to be lower than that of indicating the first beam state in the first command information. Taking the embodiment shown in FIG. 8 as an example, there are 6 beam states associated to the DCI-1 and the DCI-1 needs 3 bits for indicating one of the 6 beam states. In comparison, since single beam state group comprises 3 beam states, the DCI-2 needs only 2 bits for indicating one beam state within single beam state group. Thus, a balance between the overhead and a flexibility can be achieved.

In an embodiment, the process shown in FIG. 7 may be used in a scenario with a long-distance downlink coverage and a short distance uplink coverage due to imbalanced transmit powers between the gNB and the UE. More specifically, a power amplifier of the gNB is more powerful than that of the UE. That is, the gNB can reach higher transmit power than the UE. In such condition, the wide beam state can be used by the downlink transmissions and the narrow beam state can be used by the uplink transmissions.

Figure 9:
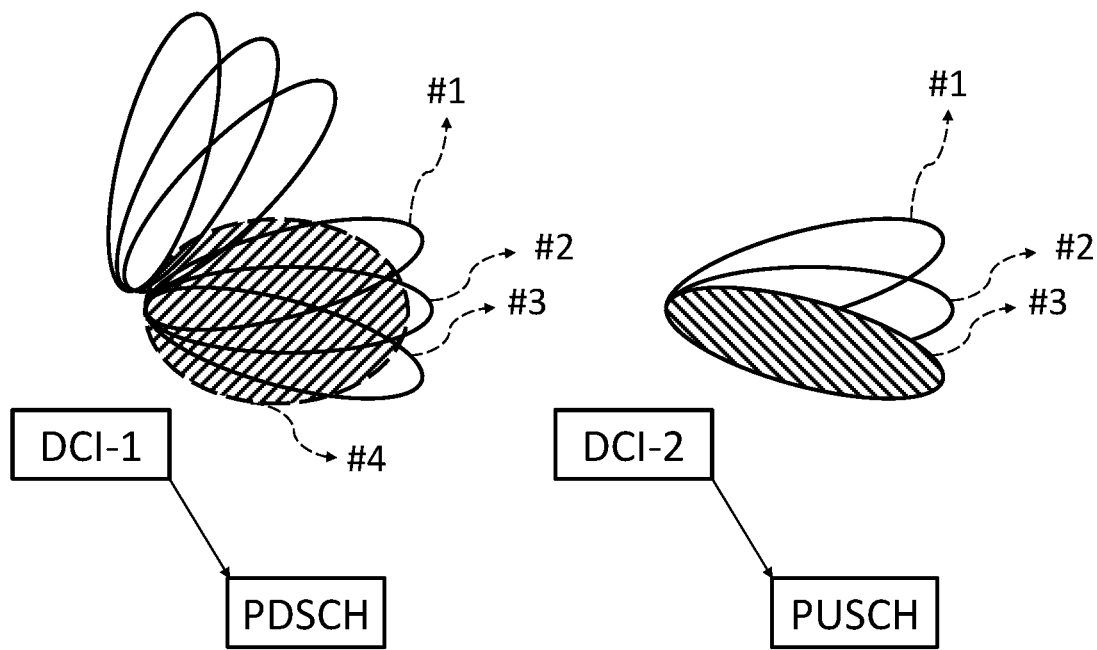
FIG. 9 shows a schematic diagram of beam states according to embodiment of the present disclosure.

FIG. 9 shows a schematic diagram of beam states according to embodiment of the present disclosure. In FIG. 9, DCI-1 indicates a beam state #4 (i.e. the first beam state) for a downlink transmission (e.g. PDSCH), wherein the beam state #4 is the wide beam state. In addition, DCI-2 indicates a beam state #3 (i.e. the additional beam state) for an uplink transmission (e.g. the PUSCH). Note that, the beam state #3 is a narrow beam state associated with (the beam state group of) the beam state #3.

In an embodiment, from UE's perspective, there may be more than one command information before the second command information and which command information should be selected as the first command information is described in the following embodiments.

In an embodiment, the second command information schedules an uplink signal and the first command information is before the second command information or before the first beam state indicated by the first command information becomes effective (available or being applied for corresponding downlink transmissions).

In an embodiment, the first command information is the most recent command information scheduling a downlink signal before the second command information, or before the first beam state indicated by the first command information becomes effective.

In an embodiment, the downlink signal comprises the PDSCH.

In an embodiment, the uplink signal comprises the PUSCH.

In an embodiment, effective times may be different for different beam states indicated by the command information, e.g., to improve the robustness of beam switching in a multi-TRPs/multi-panels (M-TRP/M-Panel) scenario.

Figure 10A:
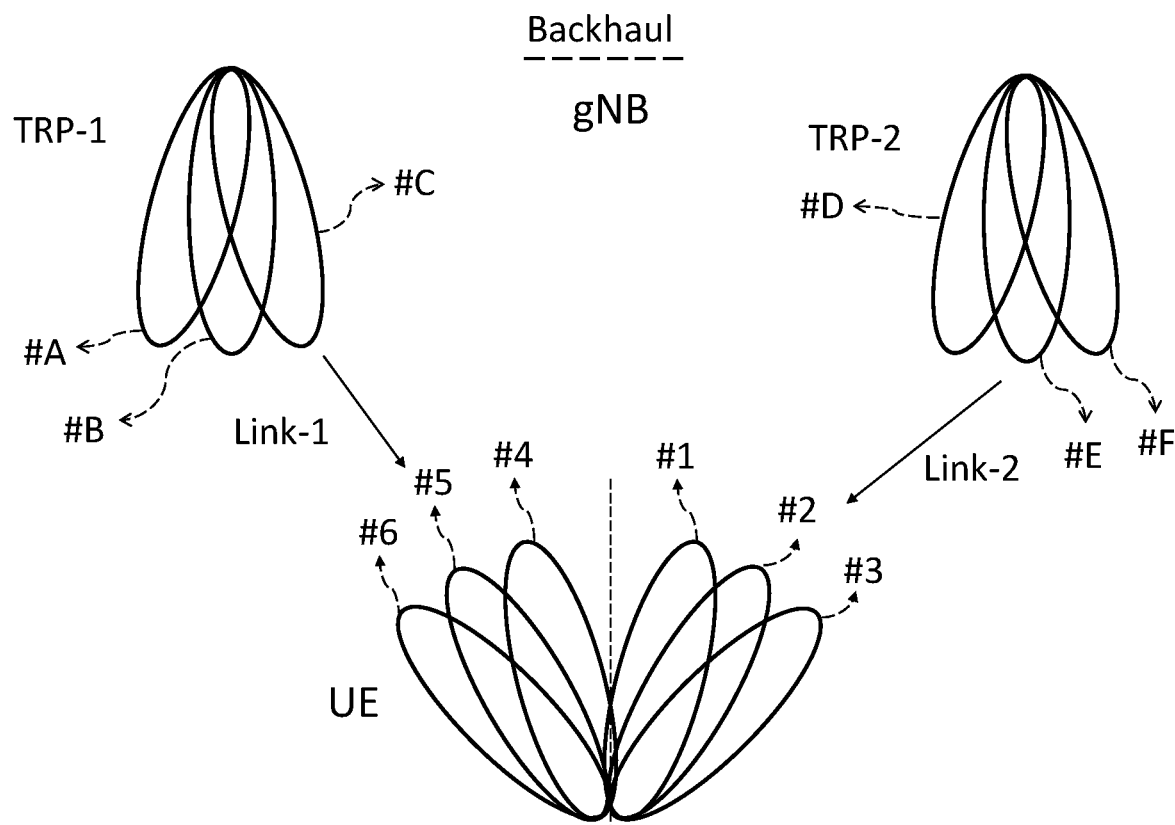
FIG. 10A shows a schematic diagram of a multi-transmission-reception-points/multi-panels scenario according to an embodiment of the present disclosure.

In the M-TRP/M-Panel scenario, there may be more than one beam links or beam pairs between the gNB and the UE. FIG. 10A shows a schematic diagram of the M-TRP/M-Panel scenario according to an embodiment of the present disclosure. In FIG. 10A, the gNB has two TRPs TRP-1 and TRP-2, wherein beams #1 to #6 are applicable for the UE, beams #A to #C are applicable to the TRP-1 and beams #D to #F are applicable to the TRP-2. In addition, there are 2 beam links (i.e. link-1 and link -2) between the UE and the gNB, wherein the link-1 uses the beam #C at the TRP-1 side and uses the beam #5 at the UE side and the link-2 uses the beam #E at the TRP-2 side and uses the beam #2 at the UE side.

When the UE moves or rotates, the UE may need to update the beam state for all or a part of the beam links. FIG. 10B shows a schematic diagram of the M-TRP/M-Panel scenario according to an embodiment of the present disclosure. In FIG. 10B, because of a movement or a rotation of the UE, the link-1 is updated to a link-1' which changes to use the beam #6 at the UE side. Similarly, the link-2 is updated to a link-2' which changes to use the beam #1 at the UE side. Generally, the new beam (e.g. the beam state #6 for the link-1' or the beam state #1 for the link-2') is expected to be effective as soon as possible. However, since errors are inevitable sometimes during a beam updating procedure, once there are different understandings between the gNB and the UE, the communications between the gNB and the UE will be broken or the UE has to re-entry to the network. For example, the gNB may notify the UE to change a new beam and does not receive an expected response from the UE within a period. In such a case, the gNB cannot know whether UE is monitoring the link with the old beam or the new beam. For example, if the previous beam change notification fails to be transmitted to the UE, the UE may still work with the old beam. As an alternative, if the UE successfully received the previous beam change notification and only the response from UE failed to reach the gNB, the UE may work with the new beam. In order to solve this problem, one straightforward possibility is to reinforce the procedure of beam updating, that may cause a long period which is not expected when the time efficiency is considered.

In the following embodiments, various embodiments for updating the beam state are exemplified. The skilled person in the art should acknowledge that these embodiments may be implemented individually or in any possible combination.

FIG. 11 shows a flowchart of a process according to an embodiment of the present disclosure. The process shown in FIG. 11 may be performed by a gNB (e.g. the BS) and comprises the following steps:

Step 1100: Communicate, by the gNB, a new second beam state for a second link via a first link with a current first beam state or the second link with a current second beam state.

Step 1101: Communicate, by the gNB, a new first beam state for the first link via the second link with the new second beam state or the first link with the current first beam state, after the new second beam is stable.

In the process shown in FIG. 11, the gNB communicates with (e.g. transmits to) the UE a new second beam state for a second link via a first link with a current first beam state (i.e. a beam state currently used for the first link) or via a second link with a current second beam state (i.e. a beam state currently used for the second link). After the new second beam is stable, the gNB communicates with the UE a new first beam state for the first link via the second link with the new second beam state or the first link with the current first beam state.

Taking FIGS. 10A and 10B as an example, the gNB transmits a new second beam state (e.g. the beam state #1) for the second link (e.g. link-2) via the first link (e.g. the link-1), e.g., with the current first beam state (i.e. the beam state #5). When the new second beam state for the second link (e.g. the link 2') is stable (e.g. can work), the gNB transmits a new first beam state (e.g. the beam state #6) for the first link (e.g. the link-1) via the second link with the new second beam state (e.g. the link-2'). Then, the link 1 is changed to be the link 1'.

In an embodiment, the first or second new beam state can also be transmitted or received via both the first and the second links.

In an embodiment, if only one link is selected to communicate the new beam state, the link with higher quality between the first and the second links may be selected.

FIG. 12 shows a flowchart of a process according to an embodiment of the present disclosure. The process shown in FIG. 12 may be performed by a gNB (e.g. the BS) and comprises the following steps:

Step 1200: Communicate, by the gNB with a UE, a new first beam state for a first link and a new second beam state for a second link, wherein one of the new first beam state and the new second beam state becomes effective after a first time point and another one of the new first beam state and the new second beam state becomes effective after a second time point.

In the process shown in FIG. 12, the gNB communicates with the UE a new first beam state for a first link and a new second beam state for a second link. In this embodiment, one of the new first beam state and the new second beam state becomes effective after a first time point and another one of the new first beam state and the new second beam state becomes effective after a second time point. That is, the new first beam state and the new second beam state may become effective after different time points.

Note that becoming effective after a time point is equal to becoming effective at a time point according to an embodiment.

In an embodiment, the first time point is earlier than the second time point.

In an embodiment, the gNB communicates with the UE via the DCI or the MAC CE.

In this embodiment, the benefit lies in low overhead (e.g. one DCI indicates multiple new beam states), high robustness (e.g. when the beam of one link is changed to new beam, the beam of another link stays on the old beam without changing, i.e. without risk) and great time efficiency (e.g. one link with new beam may work firstly and, when this link is stable, another link can start changing to apply the corresponding new beam).

In an embodiment, the command information (e.g. DCI) indicates a plurality of beam states which belong to (e.g. are classified into) X beam state groups, wherein X is a positive integer greater than 1. Among the plurality of beam states, beam states belonging to a same beam state group become effective at the same time point and beam states belonging to different beam state groups become effective at different time points.

In an embodiment, the beam states indicated by the command information corresponds to a plurality of effective time points. Among the plurality of effective time points:

the earliest effective time point is determined by a time point of transmitting or receiving the command information; or the earliest time point is determined by the time point of transmitting or receiving the command information and a first time offset; and another effective time point is determined by the earliest effective time point and an additional time offset.

In an embodiment, the first time offset and the additional time offset are predefined values or configured by a higher layer signaling (e.g. RRC signaling). In an embodiment, the predefined values may be configured by the gNB or determined based on the UE capability.

In an embodiment, DCI (which is transmitted at t0 and received at t0') indicates a beam state #1 and a beam state #2, wherein the beam state #1 becomes effective at a time point t1, and the beam state #2 becomes effective at a time point t2. In this embodiment, the time point t1 is earlier than the time point t2. In addition, the first time offset is represent by TO, and the additional time offset is represented by TA.

In an embodiment, the time point t1 is determined by the time point of transmitting or receiving the DCI (i.e. t1=t0 or t0').

In an embodiment, the time point t1 is determined by the time point of transmitting or receiving the DCI and the predefined first time offset (i.e. t1=t0+TO, or t1=t0'+TO)

In an embodiment, the second time point is determined by the time point t1 and an additional time offset (i.e. t2=t1+TA).

In an embodiment, when there are more than two beam states indicated by the DCI, the first effective time point is t1, the second effective time point is t1+TA, the third effective time point is t2+Ta, and so on.

In an embodiment, the time offset between the second effective time point and the third effective time point may be different from the time offset between the first effective time point and the second effective time point.

In an embodiment, when there is a plurality of beam states indicated by the command information (e.g. DCI) and the plurality of beam states is corresponding to X effective time points, the order of X effective points depends on one of:

an index of beam state or beam state group corresponding to an effective time point;

an order of beam state or beam state group placed in the command information corresponding to an effective time point; and/or an index of control resource set (CORESET) pool associated with the beam state or beam state group corresponding to an effective time point.

For example, the DCI may indicate a beam state #1 and a beam state #2. Since the index of the beam state #1 is smaller than the index of the beam state #2, the effective time point of the beam state #1 is earlier than that of the beam state #2.

In an embodiment, the DCI also indicates a beam state #2 and a beam state #1 in order (in sequence). In this embodiment, although the index of the beam state #1 is smaller than the index of the beam state #2, when the order of the beam states in the DCI is considered, the effective time point of the beam state #2 is earlier than that of the beam state #1 because the beam state #2 is placed in front of the beam state #1 in the DCI.

In an embodiment, the DCI indicates a beam state #1 and a beam state #2, wherein the beam state #1 is associated with a CORESET pool #0 and the beam state #2 is associated with a CORESET pool #1. Because an index of CORESET pool #0 is smaller than that of the CORESET pool #1, the effective time point of the beam state #1 is earlier than that of the beam state #2 in this embodiment.

In an embodiment, the gNB may communicate with (e.g. transmit to) the UE a new first beam state for a first link and a new second beam state for a second link, e.g., via the DCI and/or the MAC CE. When the new first beam state or the second beam state becomes effective, the new first beam state or the second beam state can be applied to the target signal.

In an embodiment, the target signal comprises one of the PDCCH, the PUCCH, the PDSCH, the PUSCH, the CSI-RS, or the SRS.

FIG. 13 shows a flowchart of a process according to an embodiment of the present disclosure. The process shown in FIG. 13 may be used in a wireless terminal (e.g. UE) and comprises the following steps:

Step 1300: Receive, from a wireless network node, first command information comprising a first beam state.

Step 1301: Determine at least one of a second beam state or a second reference signal based on the first beam state.

Step 1302: Communicate, with the wireless network node, a target signal by applying at least one of the second beam state or the second reference signal.

In the process shown in FIG. 13, the wireless terminal receives first command information from a wireless network node (e.g. BS), wherein the first command information comprises a first beam state. Based on the first beam state, the wireless terminal determines a second beam state and/or a second reference signal and communicates, with the wireless network node, a target signal by applying the determined second beam state or the determined second reference signal. In other words, by applying the determined second beam state or the determined second reference signal, the wireless terminal transmits/receives the target signal to/from the wireless network node.

In an embodiment, one of the first beam state or the second beam state comprises at least one of a quasi-co-location state, a transmission configuration indicator state, spatial relation information, reference signal information, spatial filter information or precoding information.

In an embodiment, the second beam state is associated with the first beam state.

In an embodiment, the second beam state is associated with a beam state group associated with the first beam state.

In an embodiment, the second beam state is a beam state with one of a predefined index, the first index or the last index in the beam state group associated with the first beam state.

In an embodiment, the wireless terminal receives, from the wireless network node, second command information indicating a beam state in the beam state group associated with the first beam state as the second beam state.

In an embodiment, the first command information is the most recent command information received by the wireless terminal before the second command information.

In an embodiment, the first command information and the second command information relate to the same CORESET pool.

In an embodiment, the first command information and the second command information related to at least one of the same BWP or the same serving cell.

In an embodiment, the first command information is the most recent command information with an effective beam state received by the wireless terminal before the second command information.

In an embodiment, the second beam state is a beam state of a first mode associated with the first beam state.

In an embodiment, the beam state of the first mode has a smaller beam granularity than a beam state of a second mode.

In an embodiment, a beam width of the beam state of the first mode is wider than a beam width of a beam state of a second mode.

In an embodiment, the number of the beam states of the first mode is smaller than the number of beam states of a second mode.

In an embodiment, the second beam state is at least one of an upper layer beam state of the first beam state, a reference beam state of a reference signal in the first beam state, or a synchronization signal block associated with the first beam state.

In an embodiment, the second reference signal is associated with a reference signal in the first beam state.

In an embodiment, the second reference signal is determined according to at least one of:
a reference signal in a beam state of a reference signal in the first beam state,
a reference signal quasi co-located with a reference signal in the first beam state, or
a spatial relation RS of a reference signal in the first beam state.

In an embodiment, the second reference signal is determined according to at least one of:
a reference signal in a beam state of a reference signal with a type of quasi-co-location in the first beam state,
a reference signal quasi co-located with a reference signal with a type of quasi-co-location in the first beam state, or
a spatial relation reference signal of a first reference signal with a type of quasi-co-location in the first beam state.

In an embodiment, the first beam state comprises a plurality of reference signals.

In an embodiment, the target signal is not scheduled by the first downlink control information.

In an embodiment, the target signal is associated with the first command information or with a signal scheduled by the first command information.

In an embodiment, an association between the target signal and the first command information or an association between the target signal and the signal scheduled by the first downlink control information is predefined or configured by the wireless network node.

In an embodiment, the target signal comprises at least one of a physical downlink control channel, a physical uplink control channel, a physical downlink shared channel, a physical uplink shared channel, a channel state information reference signal, or a sounding reference signal.

Figure 14:
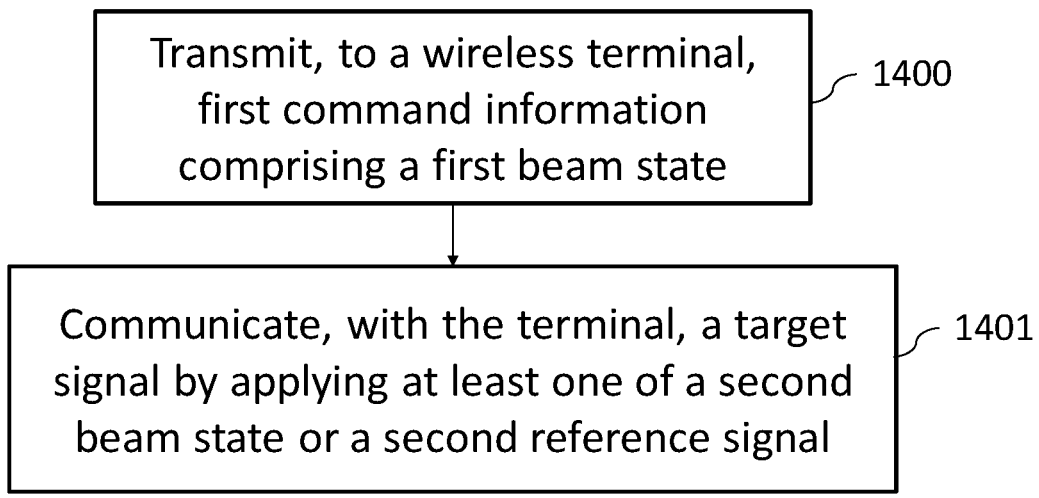
FIG. 14 shows a flowchart of a process according to an embodiment of the present disclosure.

FIG. 14 shows a flowchart of a process according to an embodiment of the present disclosure. The process shown in FIG. 14 may be used in a wireless network node (e.g. BS) and comprises the following steps:

Step 1400: Transmit, to a wireless terminal, first command information comprising a first beam state.

Step 1401: Communicate, with the terminal, a target signal by applying at least one of the second beam state or the second reference signal.

In the process shown in FIG. 14, the wireless network node transmits first command information to a wireless terminal (e.g. UE), wherein the first command information comprises a first beam state. Next, the wireless network node communicates, with the terminal, a target signal by applying at least one of a second beam state or a second reference signal. In this embodiment, the second beam state and/or the second reference signal is determined based on the first beam state.

In an embodiment, one of the first beam state or the second beam state comprises at least one of a quasi-co-location state, a transmission configuration indicator state, spatial relation information, reference signal information, spatial filter information or precoding information.

In an embodiment, the second beam state is associated with the first beam state.

In an embodiment, the second beam state is associated with a beam state group associated with the first beam state.

In an embodiment, the second beam state is a beam state with one of a predefined index, the first index or the last index in the beam state group associated with the first beam state.

In an embodiment, the wireless network node transmits second command information to the wireless network node, wherein the second command information indicates a beam state in the beam state group associated with the first beam state as the second beam state.

In an embodiment, the first command information is the most recent command information received by the wireless terminal before the second command information.

In an embodiment, the first command information and the second command information relate to the same CORESET pool.

In an embodiment, the first command information and the second command information related to at least one of the same BWP or the same serving cell.

In an embodiment, the first command information is the most recent command information with an effective beam state received by the wireless terminal before the second command information.

In an embodiment, the second beam state is a beam state of a first mode associated with the first beam state.

In an embodiment, the beam state of the first mode has a smaller beam granularity than a beam state of a second mode.

In an embodiment, a beam width of the beam state of the first mode is wider than a beam width of a beam state of a second mode.

In an embodiment, the number of the beam states of the first mode is smaller than the number of beam states of a second mode.

In an embodiment, the second beam state is at least one of an upper layer beam state of the first beam state, a reference beam state of a reference signal in the first beam state, or a synchronization signal block associated with the first beam state.

In an embodiment, the second reference signal is associated with a reference signal in the first beam state.

In an embodiment, the second reference signal is determined according to at least one of:
a reference signal in a beam state of a reference signal in the first beam state,
a reference signal quasi co-located with a reference signal in the first beam state, or
a spatial relation RS of a reference signal in the first beam state.

In an embodiment, the second reference signal is determined according to at least one of:
a reference signal in a beam state of a reference signal with a type of quasi-co-location in the first beam state,
a reference signal quasi co-located with a reference signal with a type of quasi-co-location in the first beam state, or a spatial relation reference signal of a first reference signal with a type of quasi-co-location in the first beam state.

In an embodiment, the first beam state comprises a plurality of reference signals.

In an embodiment, the target signal is not scheduled by the first downlink control information.

In an embodiment, the target signal is associated with the first command information or with a signal scheduled by the first command information.

In an embodiment, an association between the target signal and the first command information or an association between the target signal and the signal scheduled by the first downlink control information is predefined or configured by the wireless network node.

In an embodiment, the target signal comprises at least one of a physical downlink control channel, a physical uplink control channel, a physical downlink shared channel, a physical uplink shared channel, a channel state information reference signal, or a sounding reference signal.

Figure 15:
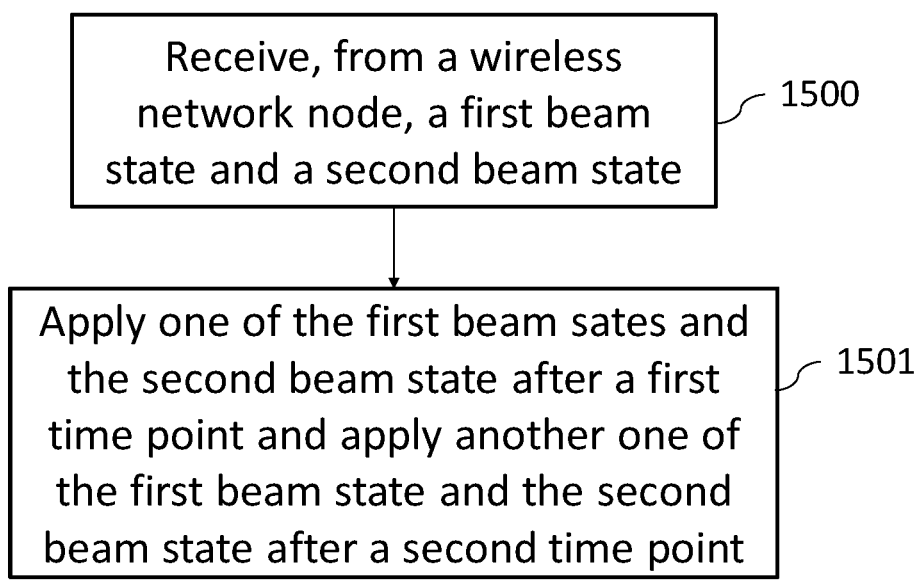
FIG. 15 shows a flowchart of a process according to an embodiment of the present disclosure.

FIG. 15 shows a flowchart of a process according to an embodiment of the present disclosure. The process shown in FIG. 15 may be used in a wireless terminal (e.g. UE) and comprises the following steps:

Step 1500: Receive, from a wireless network node, a first beam state and a second beam state.

Step 1501: Apply one of the first beam states and the second beam state after a first time point and apply another one of the first beam state and the second beam state after a second time point.

In the process shown in FIG. 15, the wireless terminal receives a first beam state and a second beam state from a wireless network node (e.g. BS). In this embodiment, the wireless terminal applies one of the first beam states and the second beam state after a first time point and applies another one of the first beam state and the second beam state after a second time point.

In an embodiment, the second time point is determined according to at least one of the first time point, or a time offset.

In an embodiment, the first time point is different from the second time point.

In an embodiment, the first beam state and the second beam state are received via at least one of DCI or a MAC CE.

In an embodiment, the first beam state is used for a first link and the second beam state is used for a second link.

In an embodiment, the second time point is determined according to at least one of: a time point of receiving response information from the wireless network node via the first link related to the first beam state, or a time offset.

In an embodiment, the first beam state is related to a CORESET pool and the second beam state is related to another CORESET pool.

FIG. 16 shows a flowchart of a process according to an embodiment of the present disclosure. The process shown in FIG. 16 may be used in a wireless network node (e.g. BS) and comprises the following step:

Step 1600: Transmit, to a wireless terminal, a first beam state and a second beam state, wherein one of the first beam states and the second beam state is applied after a first time point and another one of the first beam state and the second beam state is applied after a second time point.

In the process shown in FIG. 16, the wireless network node transmits a first beam state and a second beam state to a wireless terminal (e.g. UE). Note that one of the first beam states and the second beam state is applied after a first time point and another one of the first beam state and the second beam state is applied after a second time point.

In an embodiment, the second time point is determined according to at least one of the first time point, or a time offset.

In an embodiment, the first time point is different from the second time point.

In an embodiment, the first beam state and the second beam state are received via at least one of DCI or a MAC CE.

In an embodiment, the first beam state is used for a first link and the second beam state is used for a second link.

In an embodiment, the second time point is determined according to at least one of: a time point of receiving response information from the wireless network node via the first link related to the first beam state, or a time offset.

In an embodiment, the first beam state is related to a CORESET pool and the second beam state is related to another CORESET pool.

FIG. 17 shows a flowchart of a process according to an embodiment of the present disclosure. The process shown in FIG. 17 may be used in a wireless terminal (e.g. UE) and comprises the following step:

Step 1700: Receive, from a wireless network node, a plurality of beam states classified into a plurality of beam state groups, wherein the plurality of beam states is applied separately after a plurality of time points.

In the process shown in FIG. 17, the wireless terminal receives a plurality of beam states from a wireless network node (e.g. BS), wherein the plurality of beam states is classified into a plurality of beam state groups. In this embodiment, the plurality of beam states is applied separately after a plurality of time points.

In an embodiment, the beam states in the same beam state group become effective after the same time point.

In an embodiment, the beam states in different beam state groups become effective after different time points.

In an embodiment, the earliest time point in the plurality of time points is a first time offset after a reception time of receiving the plurality of beam states, wherein there is a second time offset between every two contiguous time points in the plurality of time points.

In an embodiment, at least one of the first time offset or the second time offset is configured by a higher layer signaling.

FIG. 18 shows a flowchart of a process according to an embodiment of the present disclosure. The process shown in FIG. 18 may be used in a wireless network node (e.g. BS) and comprises the following step:

Step 1800: Transmit, to a wireless terminal, a plurality of beam states classified into a plurality of beam state groups, wherein the plurality of beam states is applied separately after a plurality of time points.

In the process shown in FIG. 18, the wireless network node transmits a plurality of beam states to a wireless terminal (e.g. UE), wherein the plurality of beam states is classified into a plurality of beam state groups. In this embodiment, the plurality of beam states is applied separately after a plurality of time points.

In an embodiment, the beam states in the same beam state group become effective after the same time point.

In an embodiment, the beam states in different beam state groups become effective after different time points.

In an embodiment, the earliest time point in the plurality of time points is a first time offset after a reception time of receiving the plurality of beam states, wherein there is a second time offset between every two contiguous time points in the plurality of time points.

In an embodiment, at least one of the first time offset or the second time offset is configured by a higher layer signaling.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method for use in a wireless terminal, the wireless communication method comprising:
   receiving, from a wireless network node, first command information comprising a first beam state,
   determining a second beam state based on the first beam state, and
   communicating, with the wireless network node, a target signal by applying the second beam state,
   wherein the second beam state comprises at least a quasi-co-location state, and
   wherein the second beam state is indicated by a second command information as a beam state in a beam state group associated with the first beam state, and wherein the second command information is received from the wireless network node.

2. The wireless communication method of claim 1, wherein at least one of:
   one of the first beam state or the second beam state further comprises at least one of a transmission configuration indicator state, spatial relation information, reference signal information, or spatial filter information or precoding information,
   the second beam state is associated with the first beam state, or
   the second beam state is associated with the beam state group associated with the first beam state, wherein the second beam state is a beam state with one of a predefined index, a first index or a last index in the beam state group associated with the first beam state.

3. The wireless communication method of claim 1, wherein at least one of:
   the first command information is the most recent command information received by the wireless terminal before the second command information, or
   the first command information and the second command information relate to the same control resource set (CORESET) pool.

4. The wireless communication method of claim 1, wherein the first command information and the second command information related to at least one of the same bandwidth part (BWP) or the same serving cell.

5. The wireless communication method of claim 1, wherein the first command information is the most recent command information with an effective beam state received by the wireless terminal before the second command information.

6. The wireless communication method of claim 1, wherein at least one of:
   the second beam state is a beam state of a first mode associated with the first beam state,
   the beam state of the first mode has a smaller beam granularity than a beam state of a second mode,
   a beam width of the beam state of the first mode is wider than a beam width of a beam state of a second mode, or
   a number of beam states of the first mode is smaller than a number of beam states of a second mode.

7. The wireless communication method of claim 1, wherein the second beam state is at least one of an upper layer beam state of the first beam state, a reference beam state of a reference signal in the first beam state, or a synchronization signal block associated with the first beam state.

8. The wireless communication method of claim 1, wherein at least one of:
   the target signal is not scheduled by a first downlink control information, or
   the target signal is associated with the first command information or with a signal scheduled by the first command information, wherein an association between the target signal and the first command information or an association between the target signal and the signal scheduled by the first downlink control information is predefined or configured by the wireless network node.

9. The wireless communication method of claim 1, wherein the target signal comprises at least one of a physical downlink control channel, a physical uplink control channel, a physical downlink shared channel, a physical uplink shared channel, a channel state information reference signal, or a sounding reference signal.

10. A non-transitory computer-readable program medium with code stored thereupon, the code, when executed by a processor, causes the processor to implement a wireless communication method recited in claim 1.

11. A wireless communication method for use in a wireless network node, the wireless communication method comprising:
    transmitting, to a wireless terminal, first command information comprising a first beam state,
    communicating, with the wireless terminal, a target signal by applying a second beam state, and
    transmitting, to the wireless terminal, second command information indicating a beam state in a beam state group associated with the first beam state, as the second beam state,
    wherein the second beam state comprises at least a quasi-co-location state, and
    wherein the second beam state is determined based on the first beam state.

12. A wireless terminal, comprising:
    A transceiver, configured to receive, from a wireless network node, first command information comprising a first beam state,
    a processor configured to determine a second beam state based on the first beam state, and
    the transceiver is further configured to communicate, with the wireless network node, a target signal by applying at the second beam state,
    wherein the second beam state comprises at least a quasi-co-location state, and
    wherein the second beam state is indicated by a second command information as a beam state in a beam state group associated with the first beam state, and wherein the second command information is received from the wireless network node.

13. The wireless terminal of claim 12, wherein at least one of:
    one of the first beam state or the second beam state further comprises at least one of a transmission configuration indicator state, spatial relation information, reference signal information, or spatial filter information or precoding information,
    the second beam state is associated with the first beam state, or
    the second beam state is associated with the beam state group associated with the first beam state, wherein the second beam state is a beam state with one of a predefined index, a first index or a last index in the beam state group associated with the first beam state.

14. The wireless terminal of claim 12, wherein at least one of:
the first command information is the most recent command information received by the wireless terminal before the second command information, or
the first command information and the second command information relate to the same control resource set (CORESET) pool.

15. The wireless terminal of claim 12, wherein the first command information and the second command information related to at least one of the same bandwidth part (BWP) or the same serving cell.

16. The wireless terminal of claim 12, wherein the first command information is the most recent command information with an effective beam state received by the wireless terminal before the second command information.

17. The wireless terminal of claim 12, wherein at least one of:
the second beam state is a beam state of a first mode associated with the first beam state,
the beam state of the first mode has a smaller beam granularity than a beam state of a second mode,
a beam width of the beam state of the first mode is wider than a beam width of a beam state of a second mode, or
a number of beam states of the first mode is smaller than a number of beam states of a second mode.

18. A wireless network node, comprising: a transceiver, configured to:
transmit, to a wireless terminal, first command information comprising a first beam state,
communicate, with the wireless terminal, a target signal by applying a second beam state, and
transmit, to the wireless terminal, second command information indicating a beam state in a beam state group associated with the first beam state, as the second beam state,
wherein the second beam state comprises at least a quasi-co-location state, and
wherein the second beam state is determined based on the first beam state.

* * * * *